(12) United States Patent
Wenger et al.

(10) Patent No.: US 7,026,956 B1
(45) Date of Patent: Apr. 11, 2006

(54) METHOD OF INTEGRATING SPEED DEVIATION CUES IN A VEHICLE NAVIGATION DISPLAY

(75) Inventors: Jason C. Wenger, Clinton, IA (US); Alexei Postnikov, North Liberty, IA (US); Eric N. Anderson, Cedar Rapids, IA (US); Timothy J. Etherington, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 372 days.

(21) Appl. No.: 10/692,260

(22) Filed: Oct. 23, 2003

(51) Int. Cl.
*G01C 23/00* (2006.01)

(52) U.S. Cl. .................... 340/971; 340/973; 340/974; 340/975; 340/961; 340/963; 340/969; 340/945; 701/15; 701/18; 701/120; 701/221

(58) Field of Classification Search ........... 340/971, 340/973, 974, 975, 961, 963, 969, 945; 701/15, 701/18, 120, 221
See application file for complete search history.

(56) References Cited

U.S. PATENT DOCUMENTS

| | | | | |
|---|---|---|---|---|
| 6,694,233 B1 * | 2/2004 | Duff et al. | ..... | 701/23 |
| 6,865,480 B1 * | 3/2005 | Wong | ..... | 701/210 |
| 6,947,064 B1 * | 9/2005 | Hahn et al. | ..... | 345/427 |

* cited by examiner

*Primary Examiner*—Tai T. Nguyen
(74) *Attorney, Agent, or Firm*—Nathan O. Jensen; Kyle Eppele

(57) ABSTRACT

A display system for a vehicle is provided. The display system includes a display configured to render a representation of an intended vehicle path. At least one relative speed indicator is rendered upon the display. The at least one relative speed indicator is configured to move along the representation of the intended vehicle path, in an area of the display that is peripheral to a focus area of the display, in response to a difference between an actual value of a speed-based parameter and a preferred value of a speed-based parameter of the vehicle.

20 Claims, 8 Drawing Sheets

METHOD OF INTEGRATING SPEED DEVIATION CUES IN A VEHICLE NAVIGATION DISPLAY

FIELD OF THE INVENTION

The invention relates to vehicle navigation, and more particularly, to a system and method for providing speed deviation cues in a vehicle navigation display.

BACKGROUND OF THE INVENTION

The increasing complexities of vehicle navigation systems, such as those used in aircraft, require a vehicle operator to be aware of many parameters relevant to the operation of the vehicle. In an aircraft, for example, a large number of parameters relevant to proper aircraft operation must be presented to a pilot using one or more avionics displays or instruments. The constant monitoring of these parameters typically requires the pilot's eyes to focus on or shift to one or more locations one or more displays or instruments. One parameter to be viewed by an aircraft pilot is vehicle speed deviation. Typical avionics displays provide a vehicle speed deviation indicator that requires a pilot to use his or her foveal vision, which is also known as the visual focus area, to derive useful information about the speed of an aircraft relative to a reference speed. However, the vehicle speed deviation indicator competes, with other parameter displays, for the attention of the pilot. As human eyes are designed to focus on a relatively small area at a single instant, it is physiologically impossible for the pilot to truly simultaneously maintain focus of his or her eyes on a display or readout of every parameter necessary to fly the aircraft.

Some current systems attempt to provide large amounts of information to a pilot by simplifying the display of certain information so that the information can be compacted into a smaller area. However, simplifying the display of information may equate to changing commonly accepted norms and terminology for displaying the information, and such changes can cause unwarranted confusion to pilots accustomed to the norms. In addition, compacting large amounts of information into a small area may increasingly crowd or clutter the display so that it is difficult to discern the displayed information. Further, if too much information is compacted into the viewer's visual focus area, the viewer may tend to shrink his or her visual focus area in response. The subconscious shrinking of the visual focus area of a viewer thereby defeats the purpose of compacting large amounts of information into a smaller focus area.

The current development of synthetic vision systems creates additional challenges for communicating information to an aircraft pilot. Known synthetic vision systems may display a three-dimensional rendering of an intended flight path. Focusing upon maintaining the aircraft within the intended flight path may prevent the pilot from ascertaining important cues, such as aircraft speed deviation, without shifting visual focus to another portion of the display—or to another avionics display altogether. Such a shift of visual focus increases the possibility that the pilot will not be able to maintain the flight of the aircraft along the intended flight path.

It is therefore an object of the invention to provide information to an operator of a vehicle in a manner that reduces the number of parameters upon which the eyes of the operator are required to focus.

It is a further object of the invention to visually provide information to an operator of a vehicle while the eyes of the operator are focused upon a display of other information.

It is a further object of the invention to visually provide relative speed information to an operator of a vehicle while the operator is focusing on a display of other information.

It is still another object of the invention to visually provide information on a synthetic vision display in a manner that does not require an operator to focus upon the information.

A feature of the invention is the use of visual reference cues or indicators positioned to communicate relative speed-related information to an operator without requiring the operator to focus on said cues or indicators.

An advantage of the invention is the reduction of the required eye movement of an operator to ascertain information relevant to the operation of the vehicle.

SUMMARY OF THE INVENTION

The invention provides a display system for a vehicle. The display system includes a display configured to render a representation of an intended vehicle path. At least one relative speed indicator is rendered upon the display. The at least one relative speed indicator is configured to move along the representation of the intended vehicle path, in an area of the display that is peripheral to a focus area of the display, in response to a difference between an actual value of a speed-based parameter and a preferred value of a speed-based parameter of the vehicle.

The invention also provides a method of graphically expressing a difference between a preferred speed of a vehicle and an actual speed of a vehicle. According to the method, a three-dimensional representation of an intended path of the vehicle is displayed. The representation of the intended path has a central area indicating a position to attain in order to continue on the intended path. A relative speed indicator is displayed along at least one geometric component of the representation of the intended path. The relative speed indicator moves along the at least one geometric component, in an area peripheral to the central area, when the actual speed of the vehicle differs from the preferred speed of the vehicle.

The invention further provides a system for depicting differences between an actual speed of an aircraft and a preferred speed of the aircraft. The system includes a display configured to render a representation of an intended flight path. The representation of the intended flight path includes a plurality of polygons. Each polygon represents a future position along the intended flight path. Adjacent corners of adjacent polygons are connected by connecting lines to form a three-dimensional tunnel. The connecting lines include open-ended extending portions that extend from a polygon representing a most immediate future position. A plurality of relative speed indicators are rendered upon the display. Each of the relative speed indicators is configured to move along one of the connecting lines as the actual speed of the aircraft varies from the preferred speed of the aircraft.

DETAILED DESCRIPTION OF THE DRAWINGS

Figure 1:
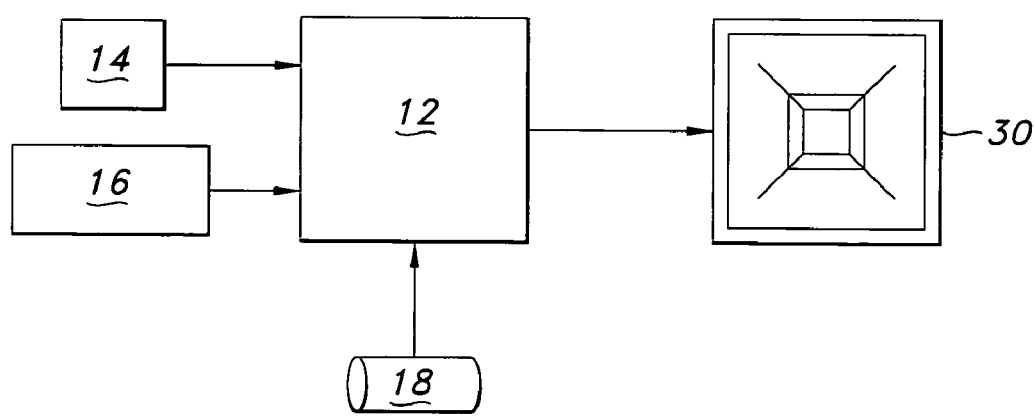
FIG. 1 is a schematic diagram of a display system configured to use the invention.

An avionics display system 10 configured to implement the invention is depicted in FIG. 1. According to the present embodiment, display system 10 is mounted in an aircraft. Display system 10 includes a processor 12 that accepts an input, either directly or indirectly, from a speed sensor 14 that detects the speed of the aircraft. The processor also accepts inputs from a flight computer 16 that provides, among other data, a preferred speed at which the aircraft should travel. The preferred speed may be determined by a preprogrammed flight plan of the aircraft, or may be a safe flight speed as computed by processor 12 and accounting for nearby terrain or other hazards.

The processor obtains data from other sources, such as a terrain database 18, to enable the processor to construct, if desired, a three-dimensional model of the environment in which the aircraft is traveling. Position and attitude sensor information may also be used to determine the location of the aircraft relative to nearby terrain. Processor 12 incorporates the data from the various sources and constructs a three-dimensional model of the environment in the general direction of the travel of the aircraft. The three-dimensional model is rendered on a display 30, which may be a typical avionics multi-function display or a head-up display (HUD). Processor 12 and display 30 may form separate units or may be constructed integrally with each other.

Figure 2:
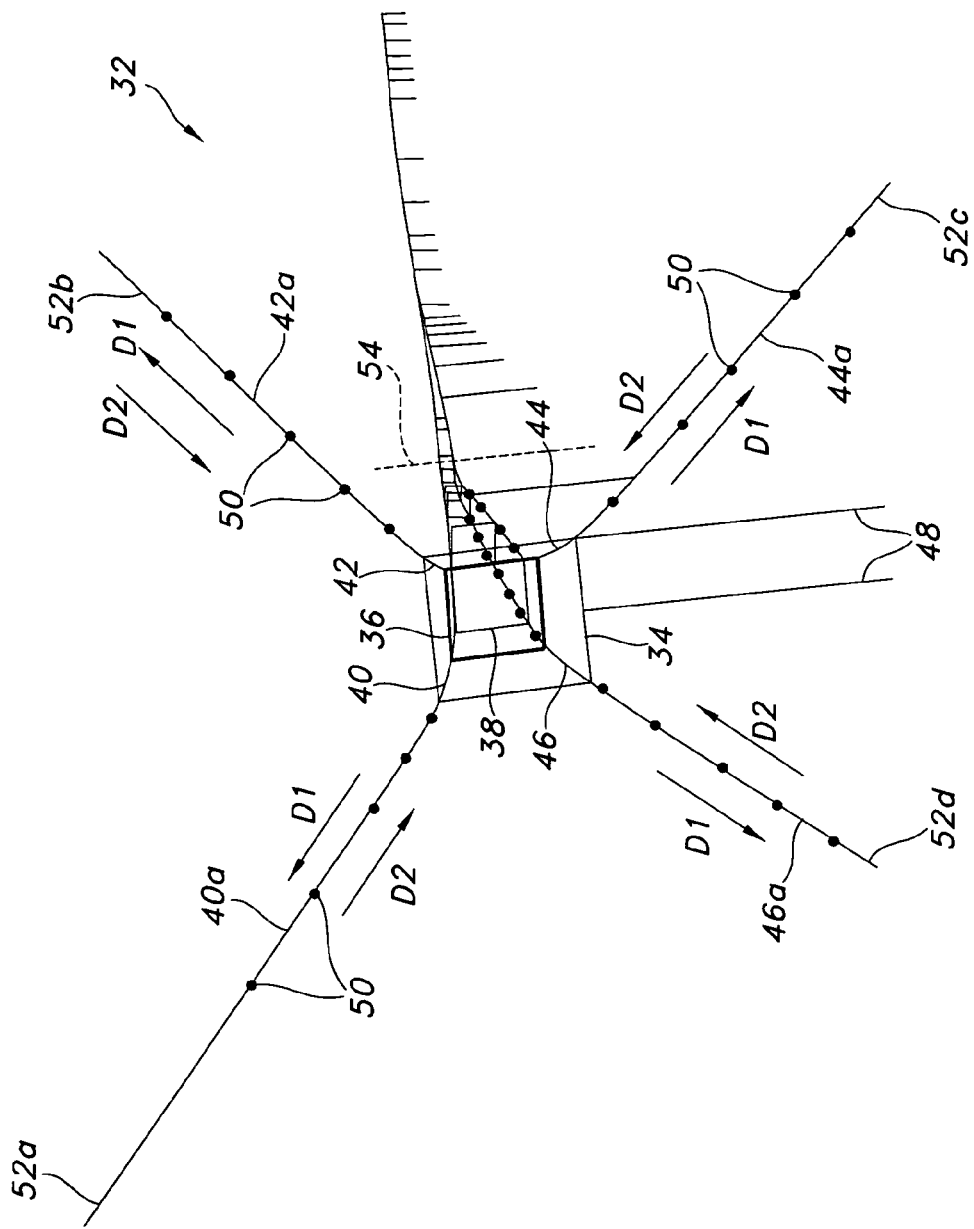
FIG. 2 is an output of a display according to an embodiment of the invention.

According to the invention, processor 12 uses the data from the various sources to predict, extrapolate, or project, a future path of the aircraft. Processor 12 generates a geometric model of the projected aircraft path, which is then incorporated into the three-dimensional model constructed by processor 12 and rendered on display 30. As shown in FIG. 2, the projected flight path 32 is expressed by plurality of geometric elements such as squares 34, 38, which represent the anticipated position of the aircraft at successive incremental times. For example, square 34 is constructed to appear closer to a viewer than square 38 and therefore represents a projected aircraft position sooner in time than square 38. Projected flight path 32 also includes a reference element 36 that expresses a location of the aircraft at a predetermined future time (such as ten seconds) if the aircraft travels along the projected flight path. Reference element 36 is highlighted to be distinguished from squares 34 and 38. As the aircraft travels along projected flight path 32, reference element 36 continuously moves along the projected flight path at the actual speed of the aircraft. The reference element is designed to provide a visual focus point for the pilot of the aircraft to ensure the pilot maneuvers the aircraft along the projected flight path.

The corners of squares 34, 38 are connected by connecting lines 40, 42, 44, 46. Taken together, the squares and connecting lines provide a tunnel-like structure for the projected flight path 32 that graphically expresses, in three dimensions, the anticipated future path of the aircraft. Each of the connecting lines has an extending portion 40a, 42a, 44a, 46a that is angled to create an impression of an entrance to the tunnel-like structure. Because the extending portions are constructed to appear closer to a viewer than the remainder of the tunnel-like structure, the extending portions extend into the peripheral vision of the viewer. Vertical lines 48 extend downwardly from the tunnel-like structure to give a sense of the altitude of the projected flight path relative to surrounding terrain.

A plurality of relative speed cues 50 are provided on connecting lines 40, 42, 44, and 46 and extending portions 40a, 42a, 44a, and 46a. The relative speed cues are shown as dots or circles preferably having a color or shade that contrasts with the color or shade of the connecting lines. The relative speed cues are designed to move along the connecting lines at the preferred speed of the aircraft. Any difference between the actual speed of the aircraft and the preferred speed of the aircraft will result in apparent movement of the cues along the connecting lines and extending portions. For example, if the actual speed of the aircraft is greater than the preferred speed, the aircraft will travel faster than the cues, resulting in apparent movement of the cues along the connecting lines and the extending portions in a direction D1, which is toward the open ends 52a–d of the extending portions. In this embodiment the open ends of the extending portions serve as foreground limits to the visibility of the cues. As the aircraft moves through the projected flight path, cues near the open ends 52a–d of the extending portions will eventually disappear and are replaced by cues at a distant visibility limit 54. The continuous movement, toward a viewer, of a never-ending succession of cues relative to the aircraft creates an impression not unlike passing never-ending lines of traffic on a freeway. On the other hand, if the actual speed of the aircraft is less than the preferred speed, the aircraft will travel slower than cues 50 through the projected flight path, resulting in apparent movement of the cues along the connecting lines and the extending portions in a direction D2, which is away from the open ends of the extending portions and toward distant visibility limit 54. As the aircraft moves through the tunnel, cues near the distant visibility limit disappear and are replaced by cues adjacent the open ends 52a–d of the extending portions. The continuous movement, away from a viewer, of a never-ending succession of cues relative to the aircraft creates an impression not unlike being passed by never-ending lines of traffic on a freeway. In either situation, a change in the rate of movement of the cues represents an acceleration or deceleration of the aircraft.

The rate of movement of the cues along the connecting lines is proportional to the difference between the actual speed and the preferred speed of the aircraft. Although in some instances it may be advantageous to express the rate of movement of the cues as a one-to-one linear relationship with the difference between the actual and the preferred speeds, there may be other instances, such as aircraft refueling, where slight speed variations can critically affect an operation. Furthermore, large speed variations may cause the cues to move so rapidly that the relative speed cannot be accurately comprehended by a viewer. The invention may compensate for either small speed variations or large speed variations by either exaggerating or minimizing the relative movement of the cues.

The position of distant visibility limit 54, which determines how far along the tunnel the cues are displayed, may be set as desired. For example, the distant visibility limit may be set far into the tunnel. However, the distant visibility limit is preferably set at an intermediate point as shown in FIG. 2 to eliminate clutter at the center of the display of the tunnel. In a variation on this embodiment, the cues may be programmed to move only along all or a part of the extending portions. Such a variation effectively sets the distant visibility limit in the foreground of the display, but maintains the relative motion effect of the moving cues.

Figure 3:
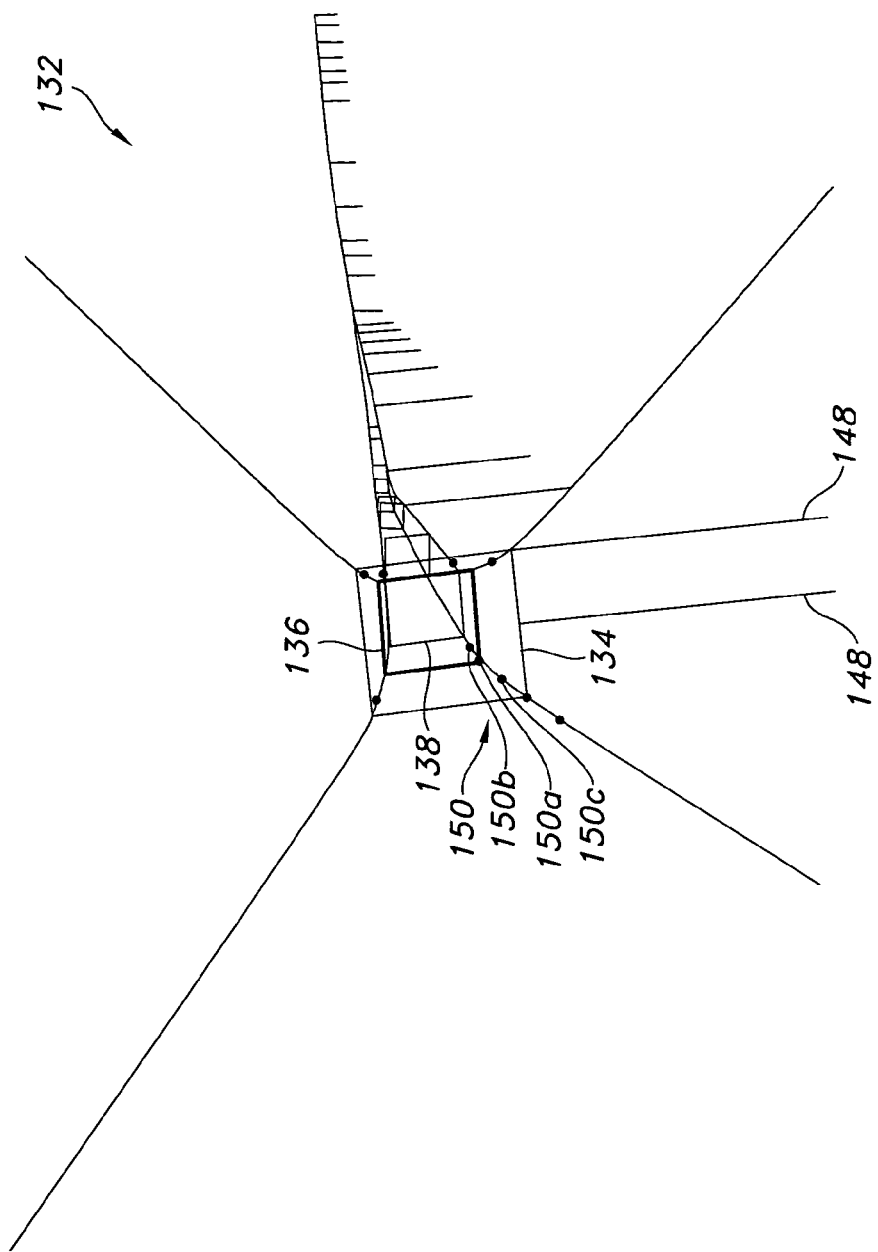
FIG. 3 is an output of a display according to another embodiment of the invention.
Figure 4:
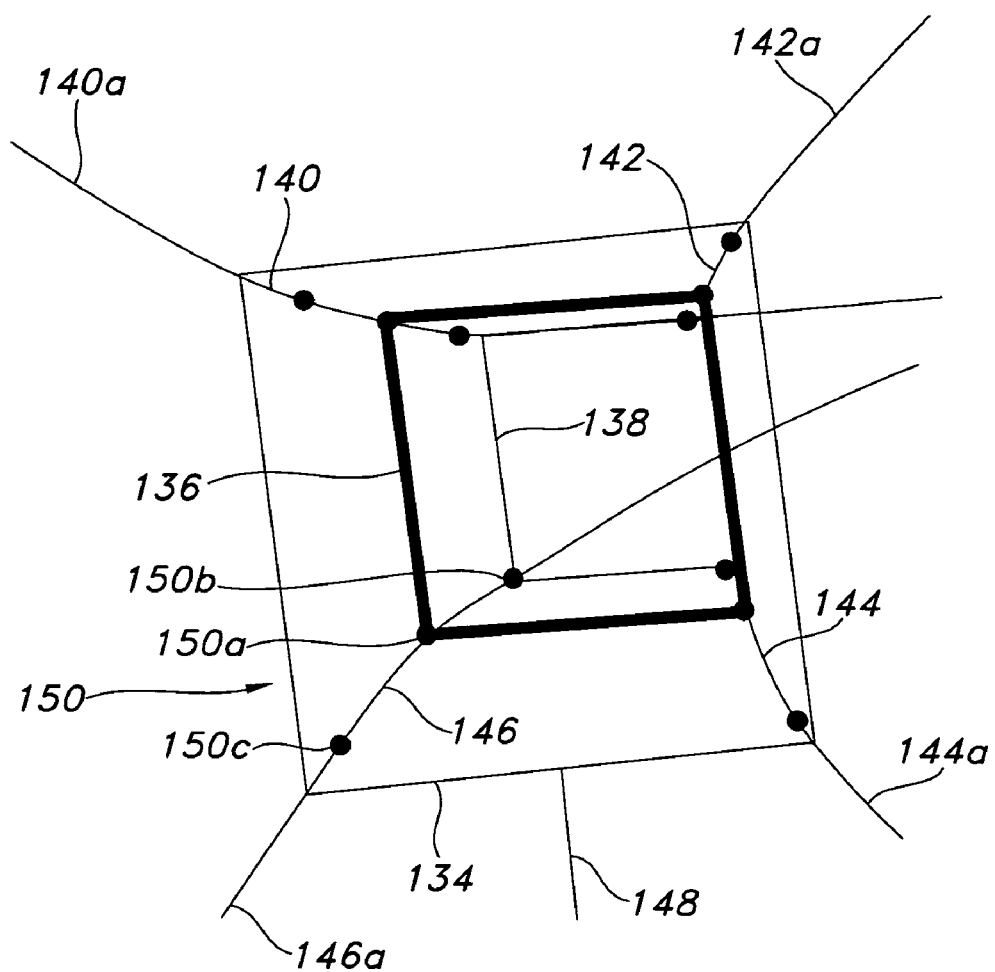
FIG. 4 is a detail view of a portion of the display of FIG. 3.

The embodiment shown in FIG. 2 expresses speed error by the relative movement of relative speed cues 50. FIGS. 3–6 show another embodiment of the invention that expresses speed error by displacement or distance, along a connecting line, from a reference point. As with the previous embodiment, the embodiment in FIGS. 3–6 includes a tunnel-like projected flight path 132 constructed of squares 134, 138, connecting lines 140, 142, 144, 146, extending portions 140a–146a and vertical lines 148, and a reference element 136. A plurality of relative speed cues 150 are provided on the connecting lines and extending portions. The relative speed cues are designed to move along the connecting lines in response to differences between the actual speed of the aircraft and the preferred speed of the aircraft. As shown in FIG. 3, Three dot-shaped cues 150a, 150b, 150c are disposed upon each of the connecting lines, although greater or fewer numbers of cues may be employed as desired. Taking the cues disposed along connecting line 146 as exemplary, if the aircraft is traveling at the preferred speed, first cue 150a is located on connecting line 146 at the location where reference element 136 contacts connecting line 146. Second cue 150b is disposed along connecting line 146 and rendered to appear further away from the viewer than first cue 150a, and third cue 150c is disposed along connecting line 146 and rendered to appear closer to the viewer than first cue 150a.

Figure 5:
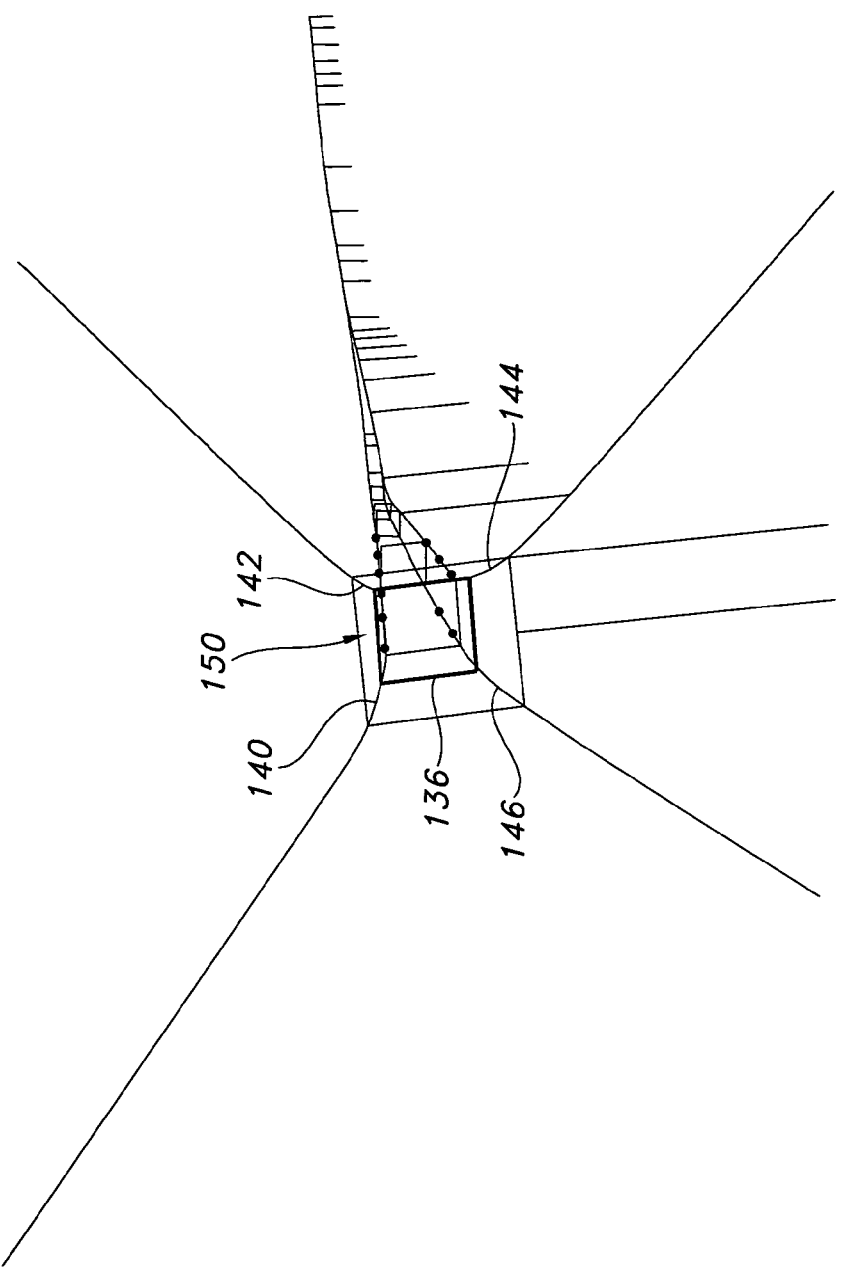
FIG. 5 is an output of a display according to the embodiment shown in FIG. 3.
Figure 6:
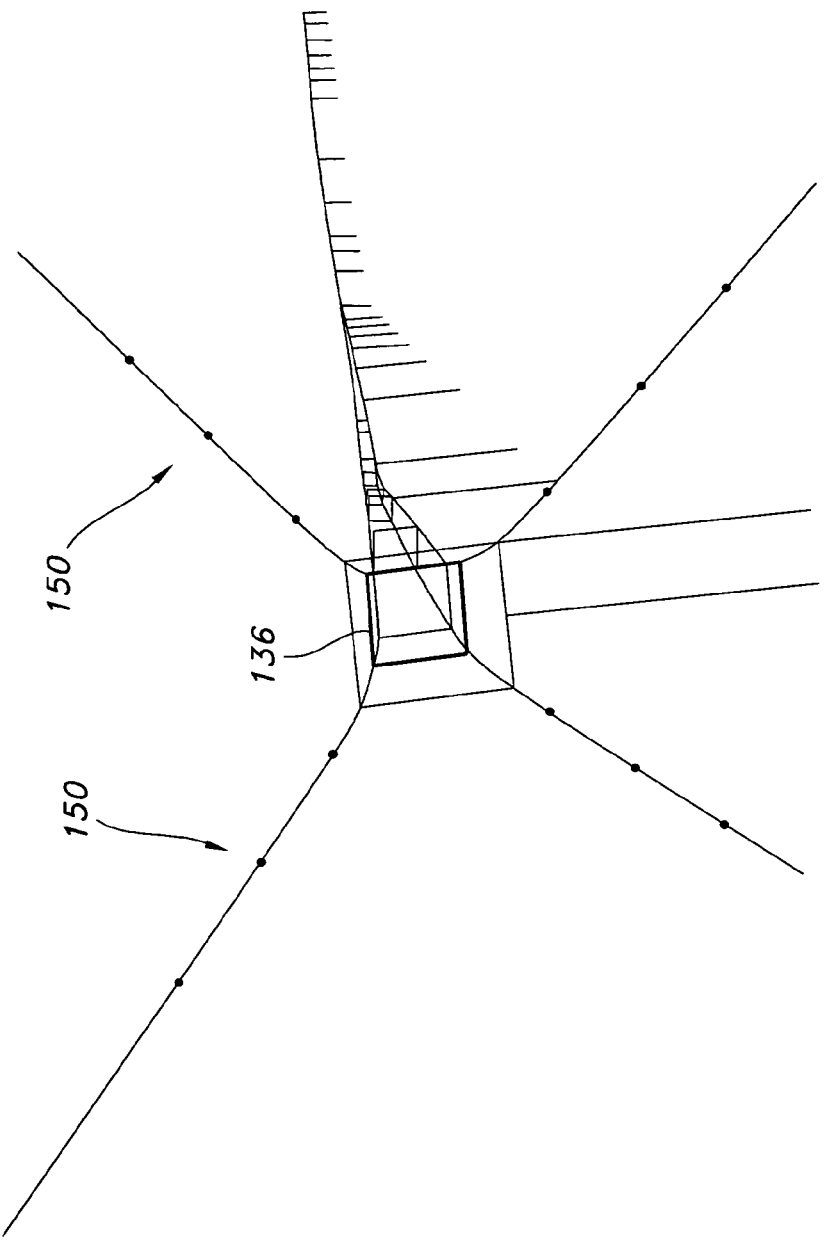
FIG. 6 is an output of a display according to the embodiment shown in FIG. 3.

If actual speed of the aircraft is less than the preferred speed, then relative speed cues 150 move along connecting lines 140, 142, 144, 146 beyond or ahead of reference element 136 into the tunnel-like structure, which as shown in FIG. 5 is a direction away from the viewer. The onward or forward movement of the cues relative to the reference element is intended to give the viewer a sense of being overtaken or "passed" by the cues, similar in effect to the view from an automobile traveling slower than surrounding traffic. In contrast, if the aircraft is traveling at a speed that is greater than the preferred speed, relative speed cues 150 move along the connecting lines in a direction toward the viewer, which as depicted in FIG. 6 is in the foreground of reference element 136. Such a movement of the cues relative to the reference element is intended to give the viewer a sense of overtaking, or "passing" the cues. This is similar in effect to the view from an automobile traveling faster than surrounding traffic. In either situation, deviation from the preferred speed causes the cues to move into the peripheral vision of the viewer, with the magnitude of the speed deviation expressed by the distance of the cues from reference element 136. Rather than focusing on the cues to ascertain a speed variation or the magnitude thereof, the viewer need only to use peripheral vision to monitor the existence and magnitude of the speed variation.

The magnitude of the difference between the reference speed and the actual speed of the aircraft determines how far along the connecting lines the cues travel, although for practical purposes the actual movement of the cues is limited by visibility concerns. For example, in FIG. 6 cues 150 can move toward the viewer only as far as the connecting lines are rendered. Likewise, in FIG. 5 the cues can move into the tunnel-like structure only so far before the cues are lost in the distance or clutter of the rendered projected flight path.

Figure 7:
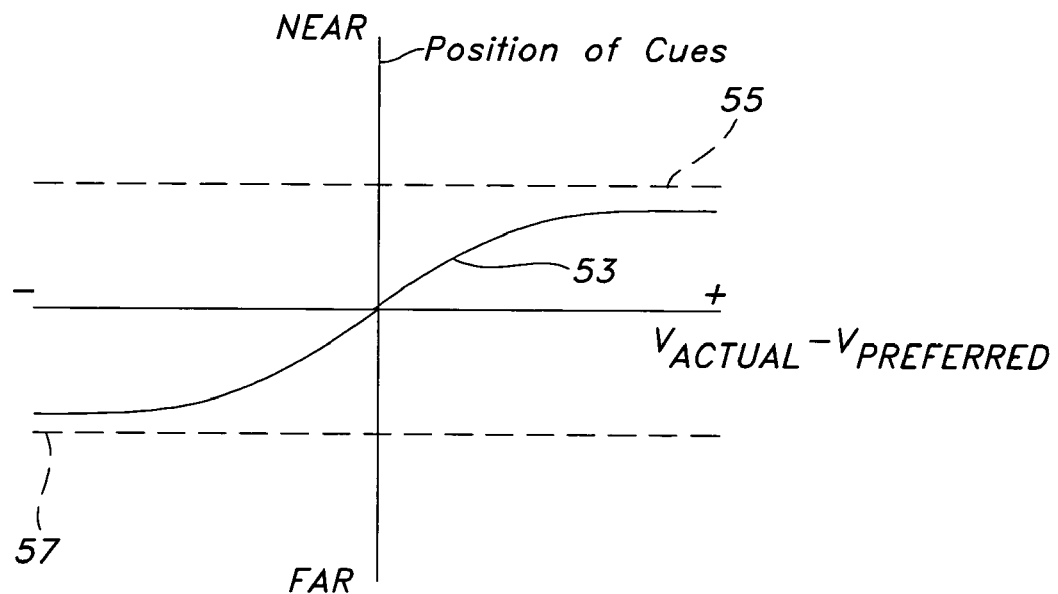
FIG. 7 is a graph expressing a function to position relative movement cues.
Figure 8:
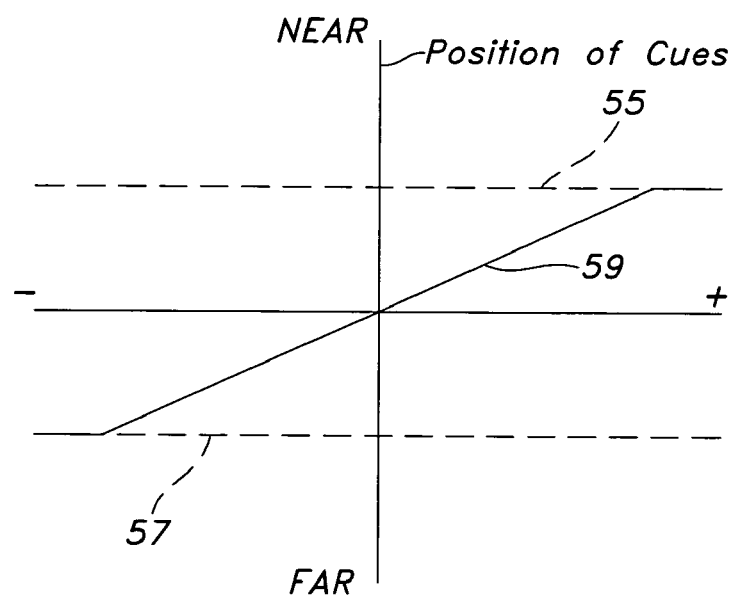
FIG. 8 is a graph expressing another function to position relative movement cues.

Preferably the movement of the cues is limited between a maximum and a minimum position. The graph shown in FIG. 7 shows one strategy for constrained cue movement. The position of the cues 150 relative to reference element 136 (in FIGS. 3–6) is expressed by line 53, which asymptotically approaches a maximum near position 55 as the difference between the actual speed and the preferred speed increases in a positive direction. Line 53 also asymptotically approaches a maximum far position 57 as the difference between the actual speed and the preferred speed increases in a negative direction. FIG. 8 shows an alternate strategy where the position of the cues is expressed by line 59, which linearly extends between the maximum near position 55 and the maximum far position 57. With either strategy, the position of the cues stays within predetermined limits to maintain visibility of the cues within the peripheral vision of the viewer.

Figure 9:
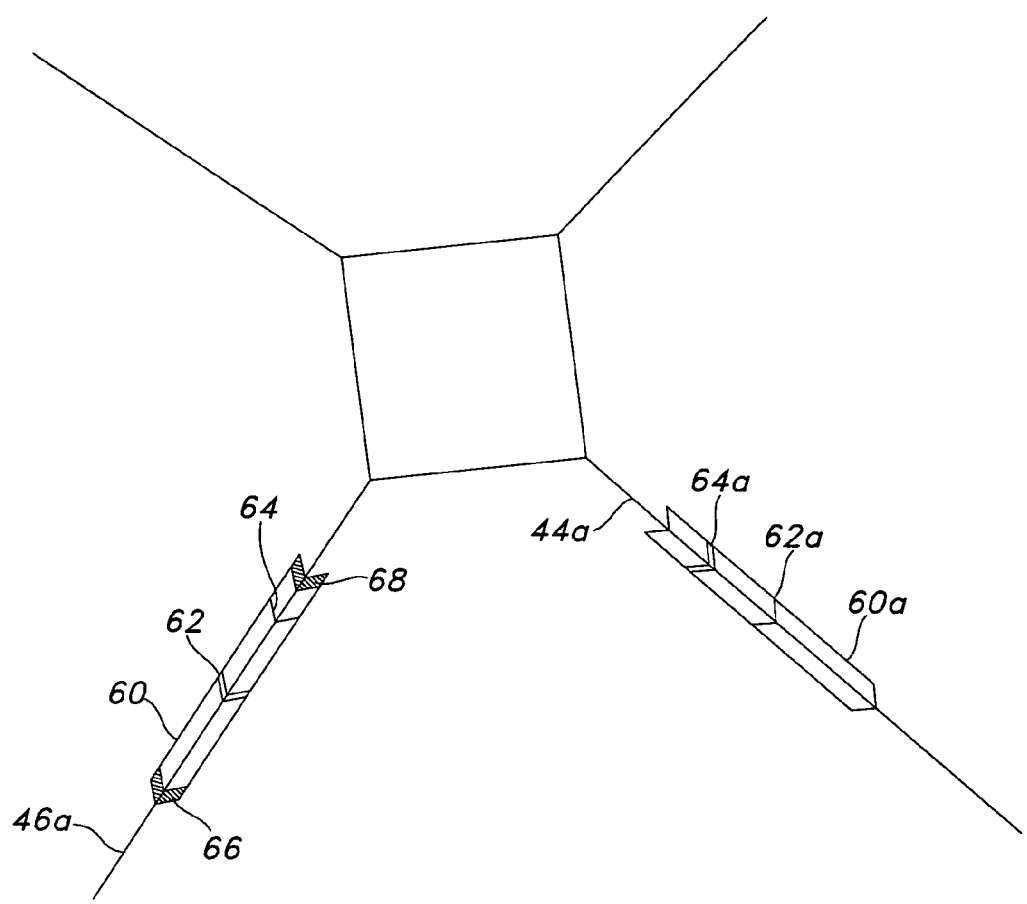
FIG. 9 is an output of a display according to another embodiment of the invention.

The invention has thus far been disclosed using circular or dot-shaped visual reference cues that travel along the connecting lines of the projected flight path. FIG. 9 shows another embodiment of the invention in which the visual reference cues are constrained to travel only along a part or region of one or more connecting portions 144a, 146a. Specifically, a region 60 having an angle-shaped cross-section is disposed along connecting portion 146a, with a reference speed indicator 62 displayed at a middle portion of region 60. A relative speed cue 64 travels along region 60 and, like previously described cues, graphically depicts the difference between an actual speed and a preferred speed. When the aircraft is traveling at the preferred speed, relative speed cue 64 is centered on reference speed indicator 62. Positive or negative deviations from the preferred speed cause relative speed cue 64 to move closer to or away from the viewer along region 60, respectively. Region 60 further includes shaded portions 66, 68 at each of its ends. Shaded portions 66, 68 represent relative speed differentials beyond what would be acceptable or expected given the flight conditions at the time. Movement of relative speed cue 64 into either shaded portion alerts the pilot that the speed of the aircraft is outside an acceptable or expected speed range. An angle-shaped region 60a on connecting portion 144a shows a variation in the appearance of the reference speed indicator 62a and the relative speed cue 64a. Of course, other shapes and variations of the appearance of the embodiment shown in FIG. 9 are possible and are within the scope of the invention. For example, the region could be shaped cylindrically, conically, or frusto-conically. Also, the reference speed indicator and the relative speed cues may be shaped and rendered as desired.

The invention has been described as being useful for expressing a difference between a preferred speed and an actual speed. However, the invention may be used to depict any generic speed-related or speed-derived information. For example, the cues may indicate a difference between an estimated time of arrival and a scheduled time of arrival. In such a situation the moving cues would communicate whether the aircraft is ahead or behind schedule. As another example, it may be desired to show closure rates or distances between nearby aircraft such as a refueling tanker. Additionally, the cues may be used to communicate approach spacing or any other airspace management application where separation management is needed for aircraft that must pass through the same space.

The embodiments depicted in the Figures and described herein show many different variations of the invention. However, the invention may be varied in many other ways as well. For instance, the relative speed cues may take any desired shape, such as dots, stars, rings, squares, etc. The color of the relative speed cues may vary, but should contrast with the color of the squares 34, 38 and connecting lines 40, 42, 44, 46. Furthermore, the color of the cues may be programmed to change to a warning color, such as amber or red, if the difference between the actual and preferred speeds of the aircraft is too great. The number of cues employed in the embodiment shown in FIGS. 3–6 may vary, although three cues on each connecting line gives good perception of movement while not cluttering up the display. With respect to the embodiment shown in FIG. 9, in which relative speed cues travel along specific regions of the connecting lines, other information may be displayed within or adjacent the regions, such as total aircraft energy error or flight plan timing errors, which may indicate the time ahead of or behind schedule. The invention has been described as being used with a three-dimensional display of an intended aircraft path, but may alternatively be used with a two-dimensional display of an intended vehicle path. Lastly, the embodiments shown in FIGS. 2–6 display cues on all connecting portions, while the embodiment shown in FIG. 9 displays cues on two of the connecting portions; however, it is within the scope of the invention to display the relative speed cues on as few as one and as many as all of the connecting portions.

Although the invention has been discussed as being used in an aircraft, it is within the anticipated scope of the invention to be used in displays installed in other types of vehicles, such as boats, trains, automobiles, or spacecraft, where visual cues of relative motion is desirable or helpful in navigation.

An advantage of the invention is that useful information relating to the speed of an aircraft is graphically provided to a user in an unobtrusive manner.

Another advantage of the invention is that the peripheral vision of the user is gainfully used to communicate relative speed information to a viewer.

Still another advantage of the invention is that the relative speed information is communicated in an intuitive graphical manner.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A display system for a vehicle, comprising:
  a display configured to render a representation of an intended vehicle path; and
  at least one relative speed indicator, rendered upon the display, and configured to move along the representation of the intended vehicle path, in an area of the display that is peripheral to a focus area of the display, in response to a difference between an actual value of a speed-based parameter and a preferred value of a speed-based parameter of the vehicle.

2. The system of claim 1, wherein the at least one relative speed indicator is configured to move along the representation of the intended vehicle path at the preferred value of the speed-based parameter such that any difference between the actual value of the speed-based parameter and the preferred value of the speed-based parameter results in apparent movement of the at least one relative speed indicator at a speed that is proportional to said difference.

3. The system of claim 2, wherein the at least one relative speed indicator comprises a plurality of relative speed indicators continuously positioned along a geometric element of the representation of the intended vehicle path between a foreground visibility limit and a distant visibility limit.

4. The system of claim 1, wherein the actual value of the speed-based parameter is an actual speed of the vehicle, and wherein the preferred value of the speed-based parameter is a preferred speed of the vehicle, and further including a reference speed indicator disposed along the representation of the vehicle path, wherein a distance between the at least one relative speed indicator and the reference speed indicator provides a graphical indication of a difference between the actual speed of the vehicle and the preferred speed of the vehicle.

5. The system of claim 4, wherein the reference speed indicator is disposed within the focus area.

6. The system of claim 4, wherein the reference speed indicator is disposed within the area of the display that is peripheral to the focus area.

7. The system of claim 6, wherein the representation of the intended vehicle path includes a region, within the area of the display that is peripheral to the focus area, within which the relative speed indicator is constrained to move, and further wherein the reference speed indicator is disposed within the region.

8. The system of claim 7, wherein the region further includes a portion that, when the relative speed indicator is positioned therein, expresses a difference between the preferred speed and the actual speed beyond a predetermined magnitude.

9. The system of claim 1, wherein the representation of the intended vehicle path includes
  a plurality of polygons, the plurality of polygons sequentially representing intended future vehicle positions, and
  a plurality of lines linking like corners of adjacent polygons, wherein each of the at least one relative speed indicators is configured to move along one of the plurality of lines.

10. The system of claim 1, further including a limit to the movement of the relative speed indicator along the representation of the intended path of the vehicle, wherein the relative speed indicator is configured to approach the limit asymptotically as the difference between the actual and preferred values of the speed-based parameters increase.

11. The system of claim 1, further including a limit to the movement of the relative speed indicator along the representation of the intended path of the vehicle, wherein the relative speed indicator is configured to approach the limit linearly as the difference between the actual and preferred values of the speed-based parameters increase.

12. A method of graphically expressing a difference between a preferred speed of a vehicle and an actual speed of a vehicle, comprising:
    displaying a three-dimensional representation of an intended path of the vehicle, the representation of the intended path having a central area indicating a position to attain in order to continue on the intended path;
    displaying a relative speed indicator along at least one geometric component of the representation of the intended path;
    moving the relative speed indicator along the at least one geometric component, in an area peripheral to the central area, when the actual speed of the vehicle differs from the preferred speed of the vehicle.

13. The method of claim 12, further comprising:
    displaying a reference speed indicator along the representation of the vehicle path, wherein a distance between the at least one relative speed indicator and the reference speed indicator provides a graphical indication of a difference between the actual speed of the vehicle and the preferred speed of the vehicle.

14. The method of claim 13, further comprising:
    defining a region of the representation of the intended vehicle path within the area peripheral to the central viewing area;
    displaying the reference speed indicator within the region; and
    constraining the relative speed indicator to move within the region.

15. The method of claim 12, further including:
    moving the at least one relative speed indicator along a portion of the three-dimensional representation of the intended path at the preferred speed of the vehicle such that any difference between the actual speed and the preferred speed results in apparent movement of the at least one relative speed indicator at a speed that is proportional to said difference.

16. The method of claim 15, wherein the at least one relative speed indicator includes a plurality of relative speed indicators, the method further comprising:
    defining a first limit to relative speed indicator movement in a foreground portion of the three-dimensional representation of the intended vehicle path;
    defining a second limit to relative speed indicator movement in a distant portion of the three-dimensional representation; and
    continuously positioning the plurality of relative speed indicators along the portion of the three-dimensional representation of the intended path between the first limit and the second limit.

17. A system for depicting differences between an actual speed of an aircraft and a preferred speed of the aircraft, comprising:
    a display configured to render a representation of an intended flight path, the representation of the intended flight path including a plurality of polygons, each polygon representing a future position along the intended flight path, wherein adjacent corners of adjacent polygons are connected by connecting lines to form a three-dimensional tunnel, the connecting lines including open-ended extending portions that extend from a polygon representing a most immediate future position; and
    a plurality of relative speed indicators, rendered upon the display, wherein each of the relative speed indicators is configured to move along one of the connecting lines as the actual speed of the aircraft varies from the preferred speed of the aircraft.

18. The system of claim 17, wherein the plurality of relative speed indicators are configured to move along the connecting lines at the preferred value of the speed-based parameter such that any difference between the actual speed of the aircraft and the preferred speed of the aircraft results in apparent movement of the plurality of relative speed indicators at a speed that is proportional to said difference.

19. The system of claim 18, wherein the plurality of relative speed indicators are configured to be continuously positioned along a connecting element between a foreground visibility limit and a distant visibility limit.

20. The system of claim 18, further including a reference speed indicator disposed along the three-dimensional tunnel, wherein a distance between at least one of the plurality of relative speed indicators and the reference speed indicator provides a graphical indication of a difference between the actual speed of the vehicle and the preferred speed of the vehicle.

* * * * *